Aug. 3, 1943.    M. M. HORNISH    2,325,856
TRACTOR DRAWN IMPLEMENT
Original Filed Nov. 29, 1940    3 Sheets-Sheet 1

Inventor
Mars M. Hornish
By Paul O. Rippel
Atty.

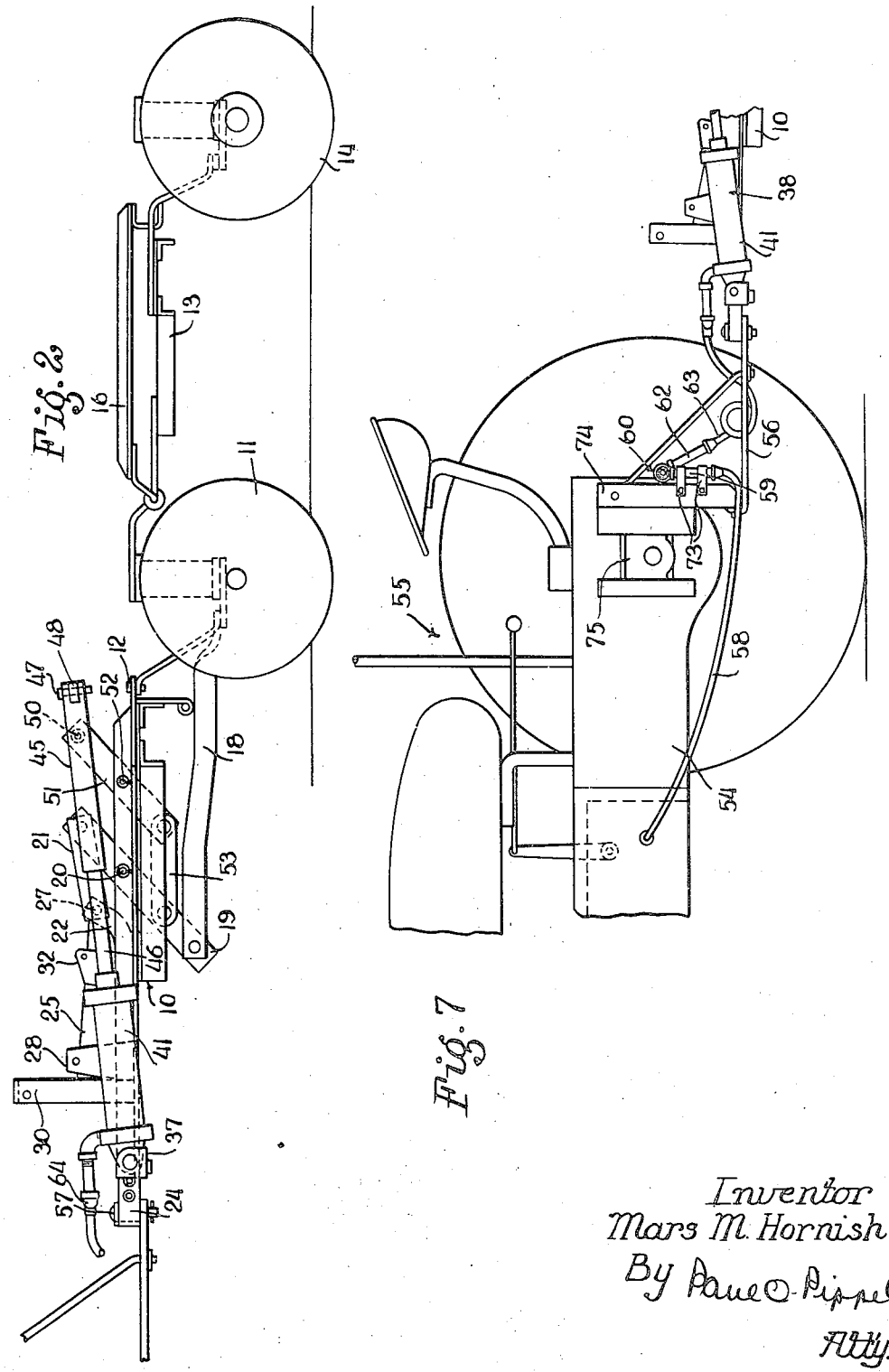

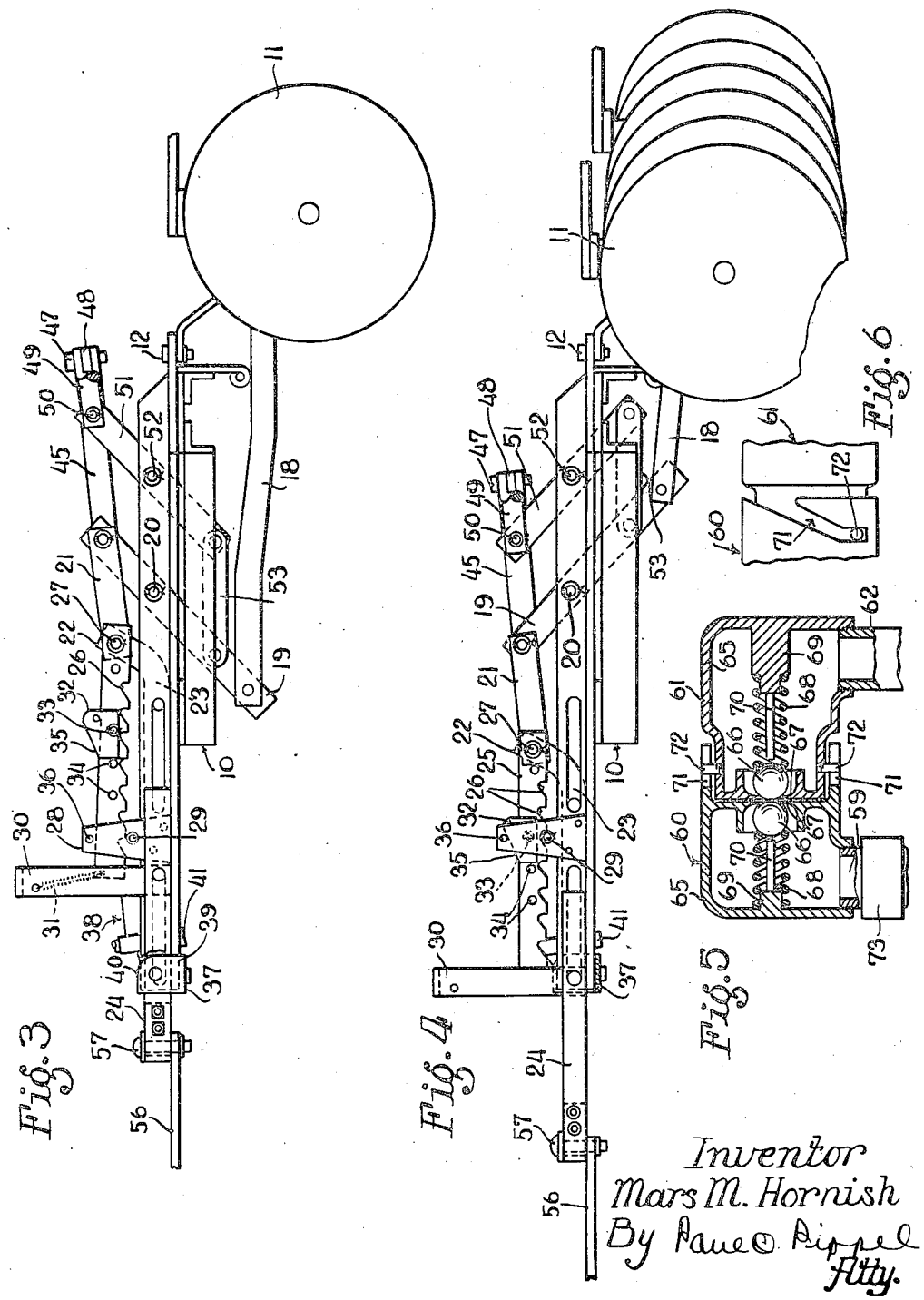

Patented Aug. 3, 1943

2,325,856

UNITED STATES PATENT OFFICE 2,325,856

TRACTOR DRAWN IMPLEMENT

Mars M. Hornish, Washington, Ill.

Original application November 29, 1940, Serial No. 367,759. Divided and this application September 18, 1941, Serial No. 411,291

7 Claims. (Cl. 55—83)

This invention relates to the adjustment of a trail-behind implement attached to a tractor, by means of a fluid-power device mounted on the implement and actuated by the tractor.

This application is a division of application Serial No. 367,759 filed by the present inventor on November 29, 1940, relating to Tractor drawn implements.

It has been known before this invention to provide a tractor-drawn implement, such as a harrow, with a fluid-power device mounted on the implement for adjusting the same. However, the application of such a fluid-power device to implements already designed for adjustment by means other than the fluid-power device mounted on the implement presents a problem, since there is not always convenient space present for the attachment of the power device.

An object of the present invention is to provide improved means for adjusting an implement drawn by a tractor.

A further object is the provision of an improved means for adjusting a harrow by means of tractor power.

A further object is to provide means for automatically limiting the movement of an adjustable part of an implement when it reaches working position.

A still further object is the provision of an improved connection between a fluid-power device mounted on a tractor-drawn implement and the source of power on the harrow.

According to the present invention, a pair of fluid-power devices is mounted on a frame of a harrow on opposite sides of a draft head slidably mounted on the harrow frame and connecting the harrow with the tractor. A fluid-power device receives fluid under pressure from the tractor through a fluid line formed of sections which may be disconnected when the harrow is disconnected from the tractor. The harrow is also provided with means which automatically limits movement of a harrow gang with respect to the frame when the gang reaches a predetermined working position and yet allows stopping of the gang by hand in any intermediate working position.

In the drawings:

Figure 2 is a side view of the parts shown in Figure 1;

Figure 3 is a view similar to Figure 2 with certain parts removed;

Figure 4 is a view like Figure 3 with the harrow in working position;

Figure 5 is a sectional view through fittings connecting sections of a fluid line supplying fluid under pressure from the tractor to the harrow;

Figure 6 is a view showing a portion of the exterior of the fittings; and,

Figure 7 is a side view showing the connection of the fittings and fluid line to the tractor and to the implement.

Figure 1:
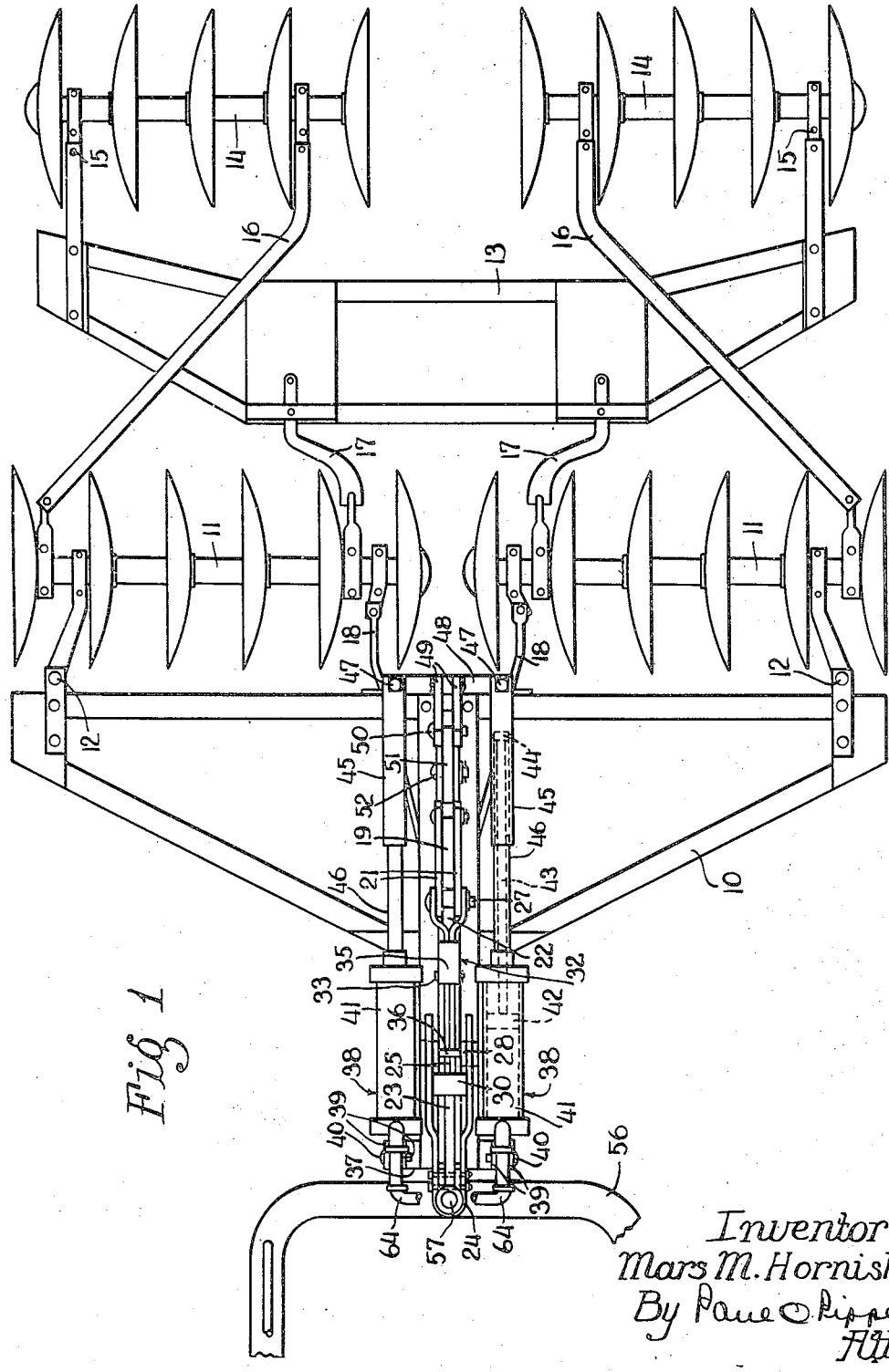
Figure 1 is a plan view showing a tandem harrow in transport position, the draw-bar of a tractor to which the harrow is attached, and the novel means of the present invention for adjusting the harrow.

As seen in Figure 1, there is provided a tandem harrow composed of a front frame 10, front gangs 11, movably connected adjacent their outer ends, as at 12, to the front frame, a rear frame 13, and rear gangs 14 movably connected adjacent their outer ends, as at 15, to the rear frame 13. Links 16 connect the inner ends of the rear gangs 14 with the outer ends of the front gangs 11. Parts 17 connect the rear frame 13 with the inner ends of the front gangs 11. Links 18 connect the inner ends of the front gangs 11 and the lower end of a lever 19, pivotally mounted at its ends on a horizontal axis, as at 20, on the front gang 10. The upper end of the lever 19 is connected, by means of a pair of elements 21, to an upstanding portion 22 of a part 23 forming part of a slidable draft-head 24. A bar 25, having ratchet teeth 26, is pivotally attached, as at 27, to the connection of the elements 21 and the part 23 and extends between upstanding members 28 secured to the frame 10. A bolt 29 extending between the members 28 is engageable with the ratchet teeth 26. The harrow as described up to the present point is like that shown and claimed in the patent to Mowry et al. No. 1,725,409, dated August 20, 1929.

As shown in the present application, a U-shaped member 30 is secured to the draft-head 24. The forward end of the bar 25 extends into the U-shaped member and is supported thereby and by means of a spring 31, which holds the ratchet teeth 26 out of engagement with the bolt 29. A stop member 32 embraces the upper side of the bar 25 and may be secured in a number of positions along the length of the bar by means of a bolt 33 which extends through the member 32 and any one of a number of holes 34 in the bar 25. The stop 32 is provided with a surface 35 sloping upwardly and rearwardly and engageable with a pin 36 extending between the members 28. When the pin 36 engages the surface 35, as shown in Figure 4, the bar is forced downwardly so that a ratchet tooth 26 engages the bolt 29.

This action has occurred as a result of the forward movement of the bar 25 occurring with a rearward movement of the inner ends of the gangs 11 toward working position. When the pin 36 engages the surface 35 so as to cause engagement of a ratchet tooth 26 with the bolt 29, further rearward movement of the gangs 11 is prevented, and the gangs are set in a predetermined working position according to the position of the stop 32 on the bar 25. For adjustment of the working position of the gangs, the stop 32 may be set in different positions along the length of the bar 25. The spring 31 normally holds the ratchet teeth of the bar 25 out of engagement with the bolt 29, but the spring may be removed so that the bar may be engaged with the bolt 29 at any intermediate position before the stop 32 engages the pin 36. Thus the harrow is provided with means which cause an automatic stopping of the gangs at a predetermined working position and permit manual stopping of the gangs at any intermediate working position.

A laterally extending bracket 37 is secured to the front frame 10 and provides a pivotal mounting for a pair of fluid-power devices 38 by means of upstanding ears 39 and pins 40. The fluid-power devices are mounted, as shown in Figure 1, on opposite sides of the draft-head 24. Each device is as shown in the patent to Lindgren, No. 2,156,570, dated May 2, 1939, and comprises essentially a cylinder 41, a piston 42 slidably mounted therein, a rod 43 secured to the piston 42 and extending from the cylinder 41 into abutting relation with a part 44 secured within a sleeve 45. The rod 43 extends within a sleeve 46, which in turn extends within the sleeve 45. The rear ends of the sleeves 45 are secured, as at 47, to the ends of a cross member 48, to the central portion of which are secured members 49. These members embrace and are pivotally connected by means of a bolt 50 to the upper end of a lever 51 pivoted between its ends on a horizontal axis, as at 52, on the front frame 10. The lower end of the lever 51 is connected, by means of a link 53, with the lower end of the lever 19.

Fluid under pressure is supplied to the fluid-power device 38 through a line extending from a body 54 of a tractor 55 having a draw-bar 56, to which the draft-head 24 of the harrow is connected, as at 57. A hose 58 extends from the body 54 and is connected to a pipe section 59. The pipe section is connected to a fitting 60 detachably connected to a similar fitting 61, which in turn has a short pipe section 62, similar to the section 59, connected thereto. A hose 63 is connected to the pipe section 62 and separates into two branches 64, each connected with a fluid-power device 38. As shown in Figure 5, the couplings 60 and 61 are each composed of a body 65, a ball valve 66 seating against a seat 67 formed in the body 65, and a spring 68 urging the ball 66 against the seat 67. The spring 68 is mounted on an interior projection 69 within the body 65 and is guided by a pin 70. When the fittings 60 and 61 are attached to one another, as shown in Figure 5, the balls 66 abut and thus force one another off their seats, so that communication is afforded between the fittings through the space between the balls and the seats. The fittings 60 and 61 are held together by means of a kind of bayonet coupling composed of a pair of bayonet slots 71 formed on opposite sides of the fitting 60 and a pair of outwardly projecting pins 72 fitting within the slots 71. When the fittings 60 and 61 are disconnected from one another, as must be the case when the harrow is disconnected from the tractor, the balls 66 no longer have contact with one another and thus are urged against their respective seats 67 so as to prevent escape of fluid. The fittings 60 and 61 are supported on the tractor by means of clamps 73 embracing the pipe section 59 and connected to a part 74 which helps to support the tractor draw-bar 56 from a rear axle 75 of the tractor 55.

Figure 1 shows the gangs of the harrow in parallel or transport position. They may be held in this position by continuous application of fluid under pressure to the fluid power devices 38, so that the pistons 42 are in their rearmost position, or by engagement of a tooth 26 on the forward end of the bar 25 with the bolt 29. When it is desired to move the gangs to working position, whatever holding means is employed is released, and the harrow is pulled forwardly. The drag of the ground upon the gangs moves the inner ends of the front gangs 11 and the outer ends of the rear gangs 14 rearwardly. As a result, the upper end of the lever 19 moves to the left, as viewed in Figure 3, moving the bar 25 forwardly with respect to the upstanding members 28. The surface 35 on the stop 32 eventually contacts the pin 36, and a ratchet tooth 26 on the bar 25 is forced into engagement with the bolt 29; thus, further rearward movement of the gangs is prevented, since a predetermined working position has been reached. When it is desired to move the gangs from working position to parallel transport position, fluid under pressure is supplied to the fluid-power devices 38, so that the pistons 42 are moved rearwardly. The rods 43 connected to the pistons act against the stop 44 and the sleeve 45 to move the member 48 and the upper ends of the levers 19 and 51 rearwardly. Thus, the lower end of the lever 19 moves forwardly and with it the inner ends of the front gangs 11 and the outer ends of the rear gangs 14. The gangs may be held in the transport position of Figure 1 either by means of continuous pressure applied to the fluid power devices 38 or by engagement of a ratchet tooth 26 on the forward end of the bar 25 with the bolt 29.

It will be apparent from the foregoing description that a new and novel construction has been provided for adjustment of a tractor attached implement, such as a harrow. Since there is considerable structure mounted on the front harrow frame along the longitudinal center line, it has been necessary to provide two fluid power devices for shifting the gangs from working position to transport position and to mount them on opposite sides of the longitudinal center line. The fluid line connecting the power devices and a source of power on the tractor is formed in sections which automatically prevent the escape of fluid upon being detached from one another. The harrow is also provided with means which automatically stops the gangs in a predetermined working position and allows the gangs to be stopped manually in any intermediate working position.

The intention is to limit the invention only within the scope of the appended claims.

What is claimed is:

1. In combination, a tractor having a power plant, an implement connected at the rear of the tractor and having an adjustable part and slidable members extending centrally, a lever pivoted between its ends on a horizontal axis on the implement and having its lower end connected with the adjustable part, means connecting the upper end of the lever and one of the slidable parts, a pair of fluid-power devices mounted on the implement on opposite sides of the slidable parts and connected with the lever, and means connecting the fluid-power devices and the tractor power plant.

2. In combination, a tractor having a power plant, a harrow connected at the rear of the tractor and comprising a frame and a pair of gangs connected adjacent their outer ends to the frame, first and second members pivoted at mid-points on the frame on horizontal axes, means connecting the lower end of the first member and the inner ends of the gangs, means connected to the upper end of the first member for limiting the angle of the gangs in working position, a link connecting the lower ends of the members, a transversely extending U-shaped part connected at a mid-point of its base to the upper end of the second member, fluid-power devices connected with legs of the U-shaped part, and means connecting the fluid-power devices and the tractor power plant.

3. A harrow comprising a frame, a gang movably connected therewith, a member connected with the gang and having a series of ratchet teeth, an element connected with the frame and engageable with the ratchet teeth so as to prevent movement of the gang in a direction toward working position, resilient means acting against the member so as to keep the ratchet teeth out of engagement with the element, and means mounted on the member so as to be adjustable along the ratchet teeth and engageable with a part on the frame for moving the member into engagement with the element against the action of the resilient means upon movement of the gang to a predetermined working position.

4. A harrow comprising a frame, a gang movably connected therewith, first and second members connected to the frame in spaced relation, a part connected with the gang and extending between the members having ratchet teeth on the side engageable with the first member so as to prevent movement of the gang in the direction of working position, resilient means holding the ratchet teeth out of engagement with the first member, and an element mounted on the side of the part opposite the ratchet teeth for adjustment along the first member and engageable with the second member so as to force the ratchet teeth into engagement with the first member against the action of the holding means upon movement of the gang into a predetermined working position.

5. In combination, a tractor having a power plant, a harrow connected at the rear of the tractor and comprising a frame, a gang movably connected therewith, a member having ratchet teeth therein and connected with the gang, an element connected with the frame and engageable with the ratchet teeth, resilient means holding the ratchet teeth out of engagement with the element, means mounted on the member for adjustment therealong and engageable with the frame so as to urge the member having the ratchet teeth into engagement with the element and thereby to limit the working position of the gang, a fluid-power device mounted on the harrow for adjusting the gang, and means connecting the device and the tractor power plant and comprising a fluid line formed of sections disconnectible from one another and having means preventing escape of fluid upon disconnection of the sections, whereby upon disconnection of the harrow from the tractor the sections of the fluid line may be disconnected from one another without loss of fluid.

6. In combination, a tractor having a power plant, a harrow connected at the rear of the tractor and comprising a frame, a gang movably connected therewith, a lever pivoted between its ends on a horizontal axis on the frame and connected at its lower end with the gang, a member having ratchet teeth thereon and connected with the upper end of the member, an element connected with the frame and engageable with the ratchet teeth, resilient means holding the ratchet teeth out of engagement with the element, means mounted on the member for adjustment therealong and engageable with the frame so as to urge the member having the teeth into engagement with the element and thereby to limit the working position of the gang, a pair of fluid-power devices mounted on the harrow frame on opposite sides of the member having the ratchet teeth and connected with the lever, and means connecting the devices and the tractor power plant.

7. An implement comprising a frame, a working element movably connected therewith, a member connected with the working element and having a series of ratchet teeth, a part connected with the frame and engageable with the ratchet teeth so as to prevent movement of the working element in a direction toward working position, means acting against the member so as to keep the ratchet teeth out of engagement with the part, and means mounted on the member so as to be adjustable along the ratchet teeth and engageable with a portion of the frame for moving the member into engagement with the part against the action of the resilient means upon movement of the working element to a predetermined working position.

MARS M. HORNISH.